Dec. 28, 1965 H. E. STANLEY 3,225,450

POSITION INDICATING DEVICE

Filed Aug. 23, 1961

INVENTOR.
HOWARD E. STANLEY

BY

OSTROLENK, FABER, GERB & SOFFEN

ATTORNEYS 3,225,450
POSITION INDICATING DEVICE
Howard E. Stanley, Los Angeles, Calif., assignor to International Rectifier Corporation, El Segundo, Calif., a corporation of California
Filed Aug. 23, 1961, Ser. No. 133,511
2 Claims. (Cl. 33—206)

My invention relates to a position indicator means and more specifically relates to means for indicating that a device is not perfectly horizontal and indicates the sense in which a positional change is required.

The principal object of the invention is to provide photosensitive means comprised of at least three segments in a substantially parallel plane. These segments are at least partially covered by an opaque fluid contained within a concave dish. When the complete unit is in a horizontal position, the opaque fluid is centered with respect to the three cells so that each of the three cells will respond in an identical manner to incident radiation upon the unit. When the unit moves out of a horizontal position, the opaque fluid will move with respect to the cells to prevent incident radiation from reaching all three cells in an identical manner whereby the resistance (or output voltage) of each of the cells will be some function of the position of the opaque fluid body and thus the position of the indicator.

If desired, the three cells can be connected in a servosystem which drives an indicator means to indicate the angular position of the indicator device in accordance with the electrical condition of the photo-sensitive devices.

Accordingly, a primary object of this invention is to provide a novel position indicator means.

Another object of this invention is to provide a novel indicator means wherein an opaque fluid body moves with respect to pre-positioned photosensitive devices to affect the electrical characteristics of the photosensitive devices in accordance with the position of the opaque fluid.

These and other objects of this invention will be apparent from the following description when taken in connection with the drawings in which.

Figure 1:
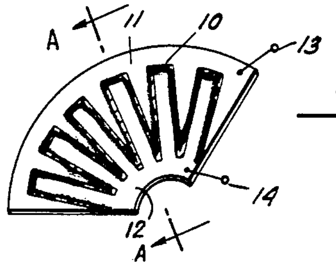
FIGURE 1 shows a top view of one of the photosensitive elements of the novel device where the device utilizes cadmium sulfide cells.
Figure 1A:
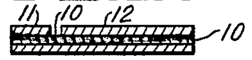
FIGURE 1A is a section of the photosensitive element of FIGURE 1, viewed along line A—A in FIGURE 1.

Referring first to FIGURE 1, I have illustrated therein one photo cell formed as a section of a disc and which has a cadmium sulfide pattern 10 interposed between a first conductive electrode 11 and second conductive electrode 12. Conductive electrode 11 is connected to an electric terminal 13 while conductive electrode 12 is connected to a terminal 14.

The device behaves in the manner typical of cadmium sulfide cells where the electrical resistance of the device depends upon the incident radiation on the cadmium sulfide layer 10. Moreover, when a portion of incident radiation directed at layer 10 is blocked, the resistance of the cell will change accordingly since, in effect, the length of layer 10 is reduced.

Figure 2:
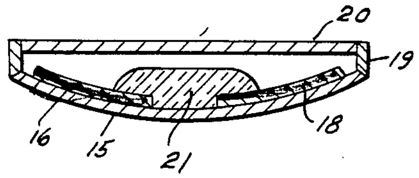
FIGURE 2 is a side cross sectional view of the assembled device.
Figure 3:
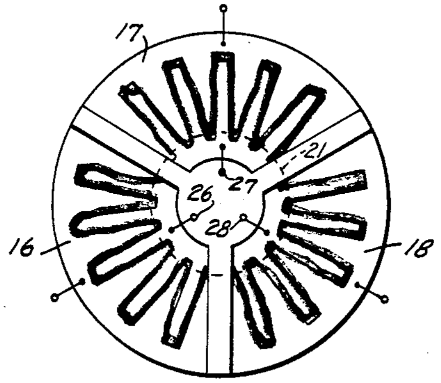
FIGURE 3 is a top plan view of the device of FIGURE 2.

In accordance with the present invention, three cells of the type shown in FIGURE 1 are distributed around the surface of a concave dish 15, as best shown in FIGURE 2. The manner in which the cells are distributed is best shown in FIGURE 3 for the case of cells 16, 17 and 18 which are each identical to the cell of FIGURE 1. The cells are placed as shown in FIGURE 2 for the case of cells 16 and 18 directly on the upper surface of dish 15 and can, for example, be cemented thereto.

An angular ring 19 is connected around the outer periphery of dish 15 and receives a transparent cover 20. The cover 20, ring 19 and dish 15 preferably form a sealed housing. Contained within this housing is a fluid 21 which is opaque or at least opaque to selected portions of the spectrum.

The position of opaque fluid 21 is illustrated in FIGURE 3 by the dotted line to indicate that the fluid symmetrically covers cells 16, 17 and 18 in an identical manner. Clearly, if the assembly of FIGURE 2 is now tilted from the position shown, the fluid 21 will move to cover a greater area of one of the cells and a lesser area of the other cells. Thus the resistance of the area of the cells which are covered will be increased while the resistance of the area uncovered will be decreased.

Figure 4:
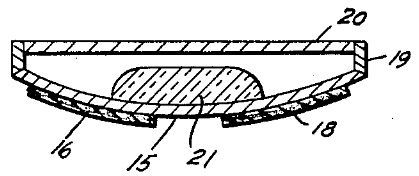
FIGURE 4 shows a further embodiment of the invention in a cross sectional view.

Referring now to FIGURE 4 where components identical to those of FIGURES 2 and 3 have been given similar identifying numerals, dish 15 is formed of a transparent material such as glass. Therefore, the cells such as cells 16, 17 and 18 of FIGURE 3 can be mounted immediately adjacent to the bottom surface of dish 15 with their photosensitive surfaces facing upwardly. Accordingly, the fluid 21 can now float on the smooth upper surface of dish 15. Again, however, the opaque fluid 21 will block light to portions of cells 16, 17 and 18 of FIGURE 4 depending upon the angular position of the assembly.

With the novel assemblies described above in FIGURES 1 through 4, it is clear that the angular position of the assembly with respect, for example, to a horizontal position can be identified in accordance with the resistance of the various photosensitive devices.

Figure 5:
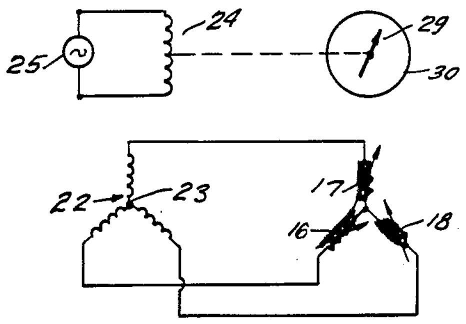
FIGURE 5 is an electric circuit diagram illustrating the manner in which the unit of FIGURES 2 or 4 can be connected in a servo system to drive a position indicator.

The manner in which the electrical characteristics of cells 16, 17 and 18 may be used to deliver a mechanical indication is shown in FIGURE 5. Thus, in FIGURE 5 a servo generator 22 having a three phase stator 23 and single phase rotor 24 is provided where A.-C. source 25 is connected to rotor 24. The cadmium sulfide cells 16, 17 and 18 are schematically illustrated in FIGURE 5 and are connected in Y. For example, in FIGURE 3 terminals 26, 27 and 28 of elements 16, 17 and 18 respectively, may be directly connected to form this Y connection. The outer ends of each of the cells are then connected to a respective stator winding as shown in FIGURE 5. The rotor 24 is then mechanically coupled to an indicating pointer 29 of indicator 30.

Accordingly, in operation the individual currents in stator windings 23 will depend upon the resistance of the various cadmium sulfide cells. This in turn will determine the angular position which rotor 24 will assume with respect to the stator which may be rigidly mounted. Thus, the angular position of the indicating pointer on indicator 30 is determined by the angular position of the indicator structure which includes the opaque fluid 21. Clearly, an appropriate coupling linkage can be provided between rotor 24 and pointer 29 to provide any desired functional relation between the position of fluid 21 and pointer 29.

It is to be noted that the servo system of FIGURE 5 is typical of only one of many types of indicating means which could be provided and which are well known to those skilled in the art.

In the foregoing I have described my invention only in connection with preferred embodiments thereof. Many variations and modifications of the principles of my invention within the scope of the description herein are obvious. Accordingly, I prefer to be bound not by the specific disclosure herein, but only by the appending claims.

I claim:

1. A position indicating device comprising:
(a) a dished member having a concave lower surface;
(b) a photocell array constituted of three photocells disposed adjacent said concave surface and positioned symmetrically of the center thereof;
(c) an opaque fluid positioned within said dished member extending symmetrically of the center of the concave surface thereof when the dished member is positioned horizontally, the opaque fluid moving to block a larger area of one of said three photocells than of another of said cells when the dished member moves out of the horizontal position;
(d) a pair of terminals connected to each of said photocells, a first terminal of each of said pairs being electrically interconnected;
(e) a servo generator having a three phase stator and a single phase rotor energized by said stator, the stator windings being electrically connected to the second terminals of the respective pairs of terminals; and (f) an indicator means mechanically connected to said rotor and being actuated thereby.

2. The position indicating device as defined in claim 1, in which said photocell array is defined by three cadmium sulfide photocells mounted on the concave surface of said dished member.

References Cited by the Examiner

UNITED STATES PATENTS

| | | | |
|---|---|---|---|
| 1,187,519 | 6/1916 | Galvin | 33—205.5 |
| 2,252,727 | 8/1941 | Pepper. | |
| 2,268,256 | 12/1941 | Knouse | 33—205 |
| 2,338,811 | 1/1944 | Hasbrook | 33—206.5 |
| 2,387,313 | 10/1945 | Wilson | 33—206 |
| 2,620,571 | 12/1952 | Varian | 33—206 |
| 2,698,428 | 12/1954 | Wikkenhauser | 340—193.2 |
| 2,701,875 | 2/1955 | Baltzer | 340—193.2 |
| 2,736,848 | 2/1956 | Rose | 136—89 |
| 3,082,400 | 3/1963 | Coop | 33—205 |

FOREIGN PATENTS

| | | |
|---|---|---|
| 862,899 | 3/1961 | Great Britain. |

ISAAC LISANN, *Primary Examiner.*